INVENTORS.
Richard P. Krause
Ira W. Lakin
BY
Green, McCallister & Miller
THEIR ATTORNEYS

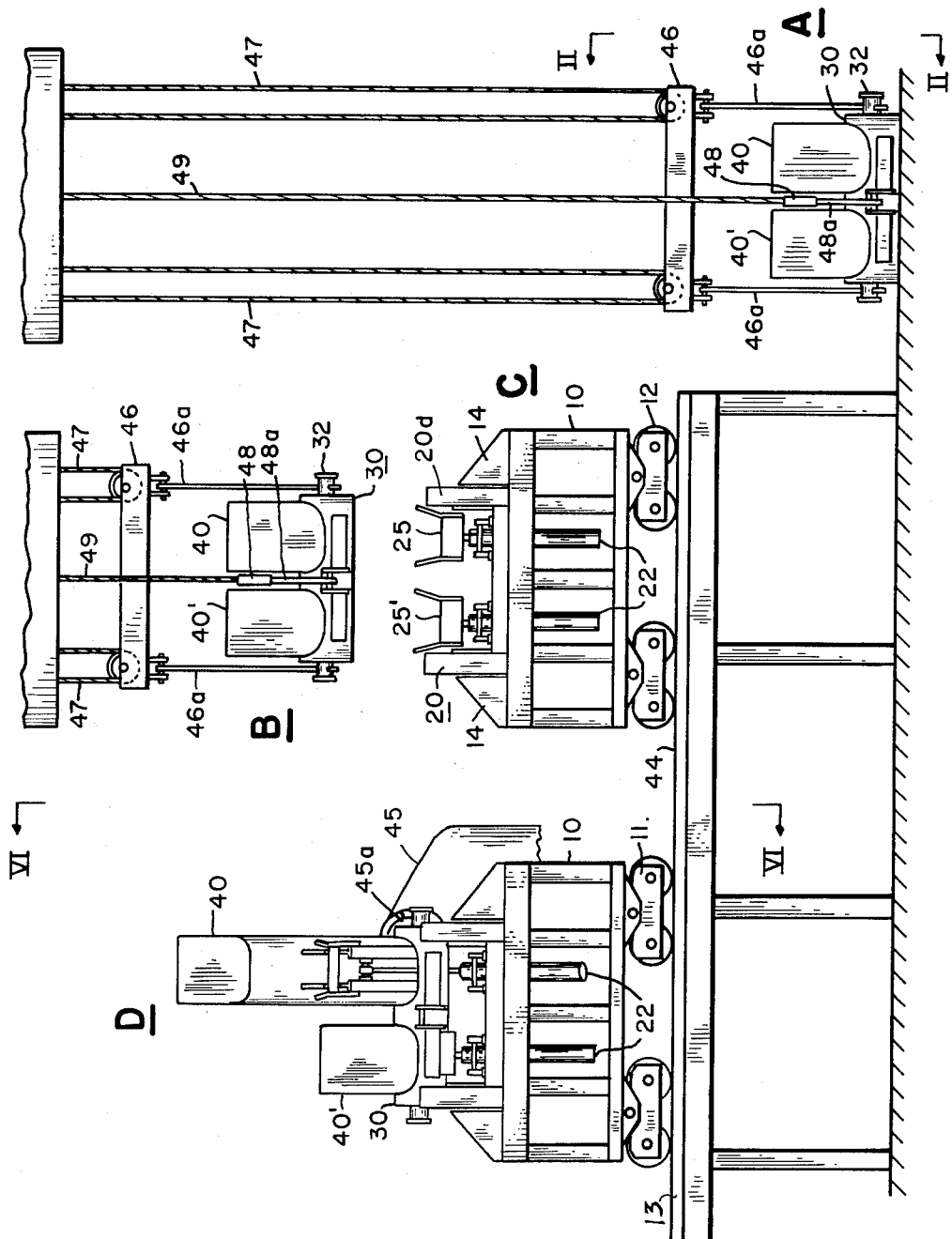

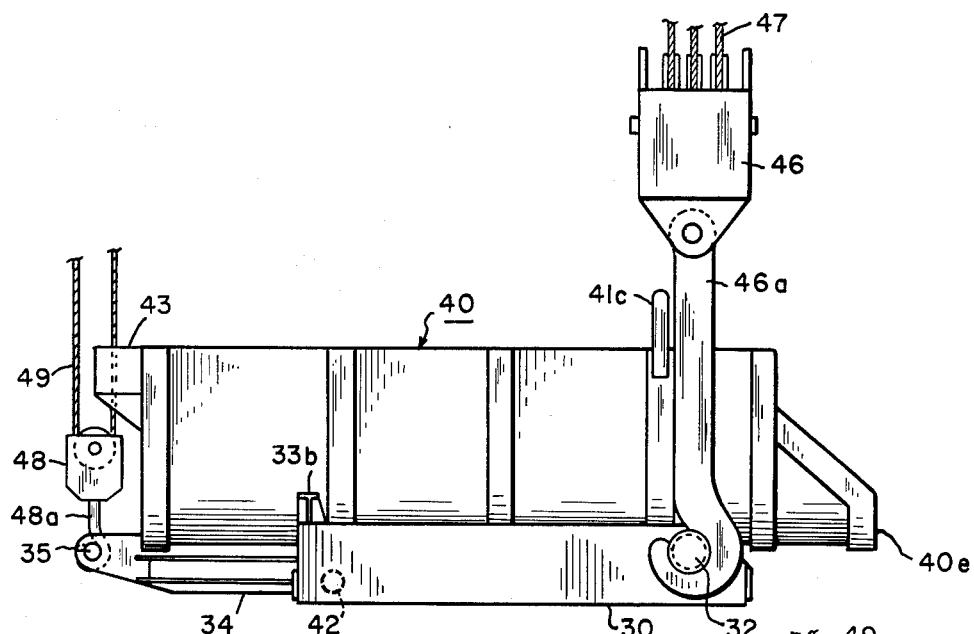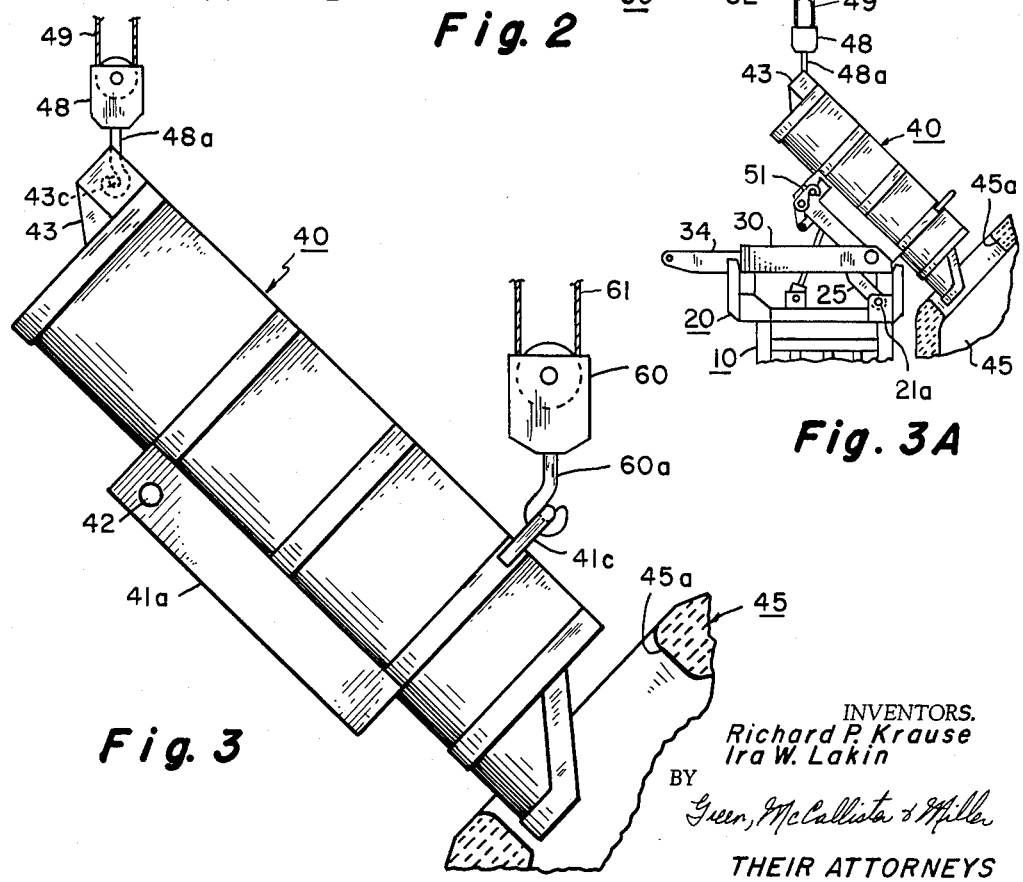

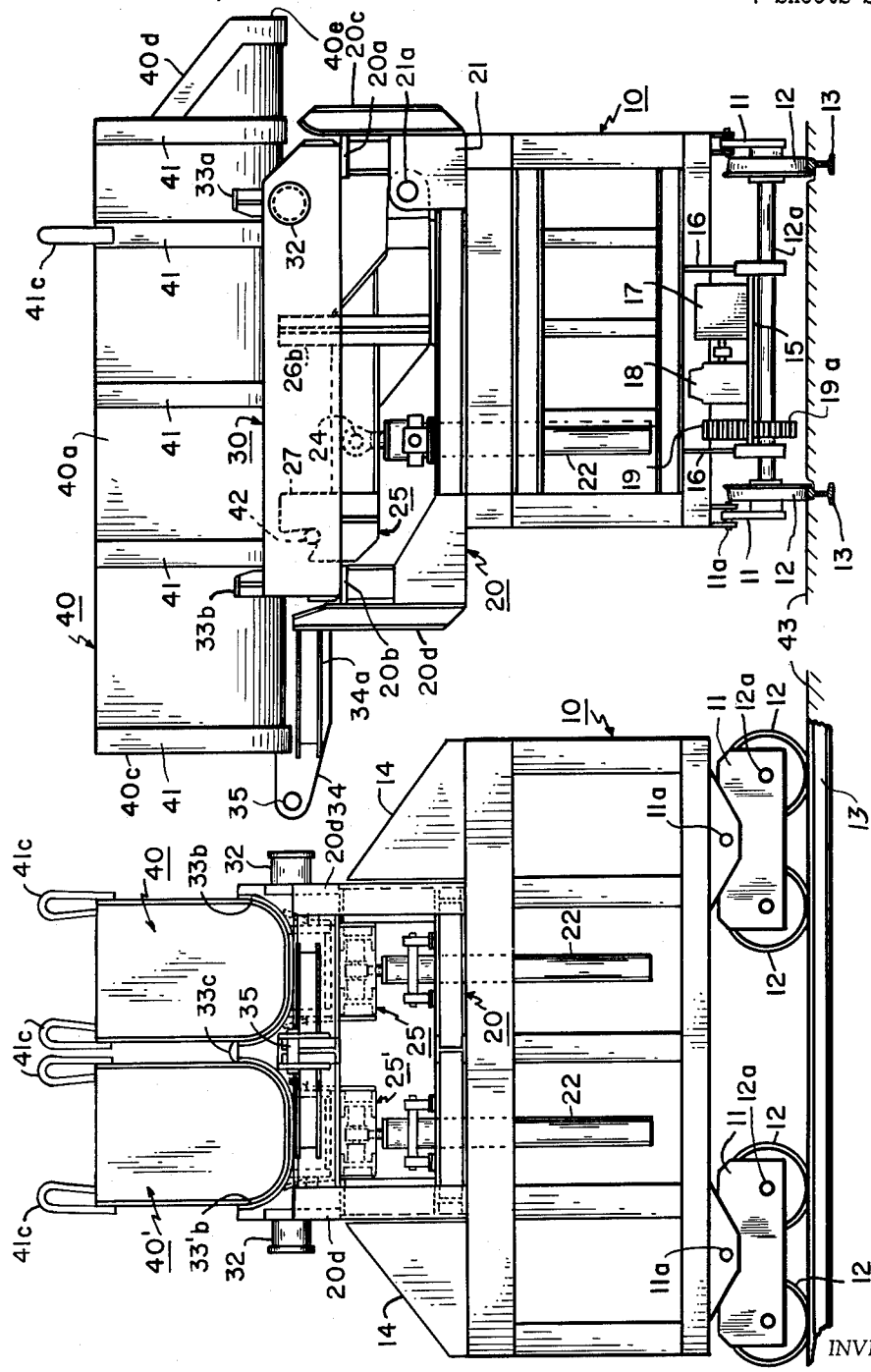

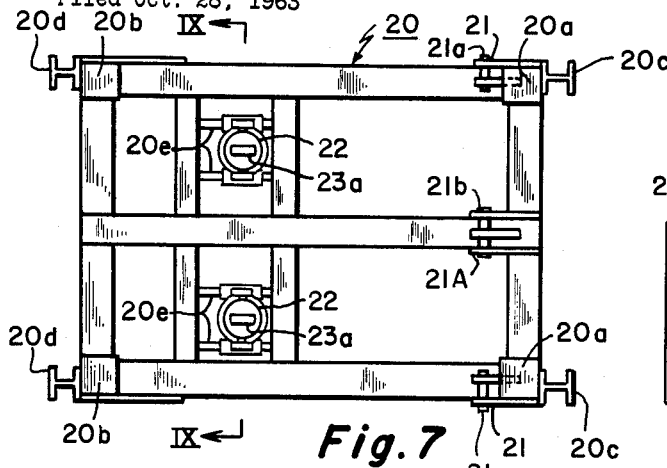
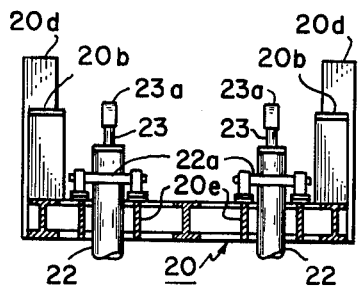
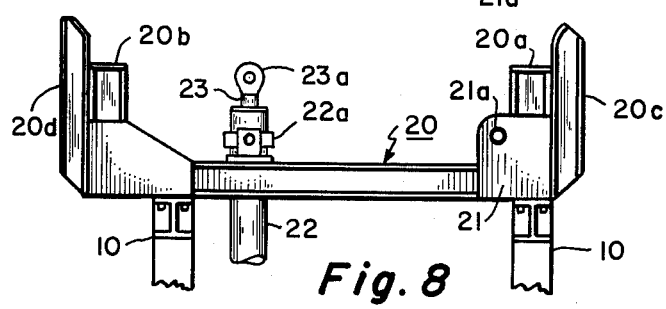
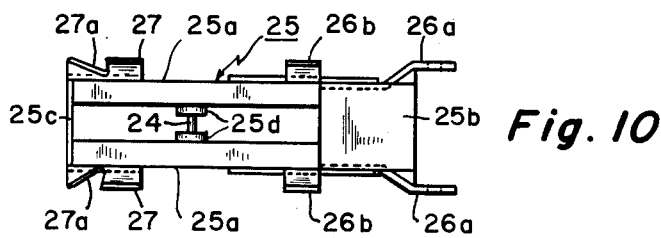
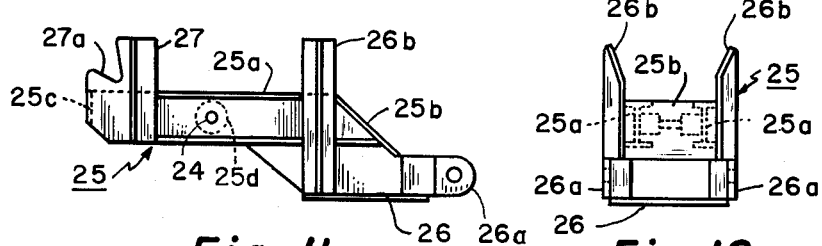
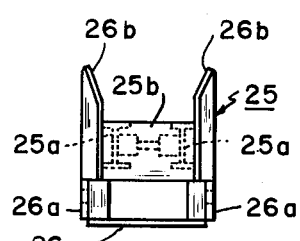

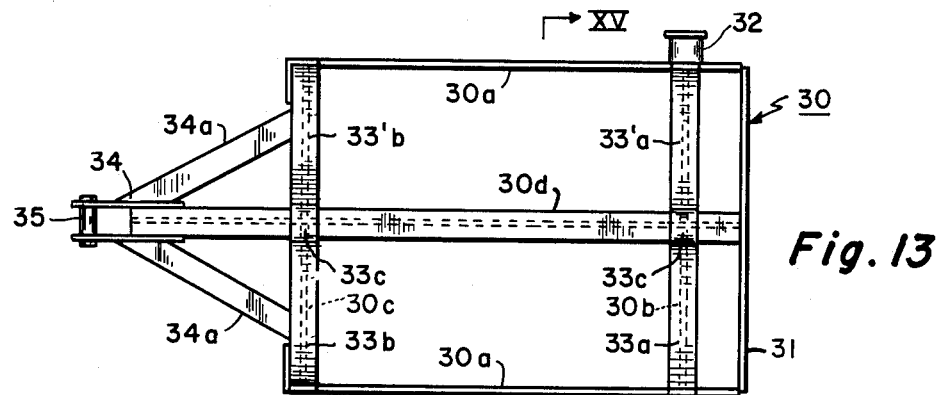
Fig. 13
Fig. 14
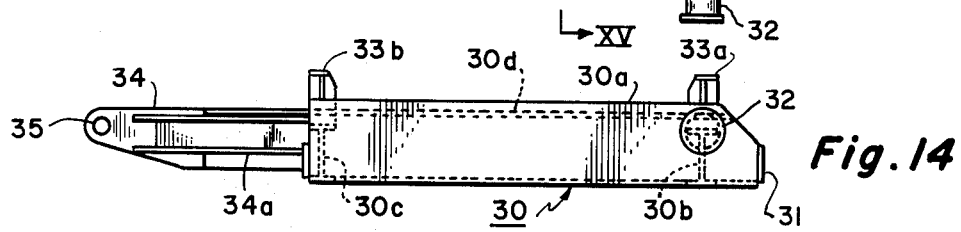
Fig. 15
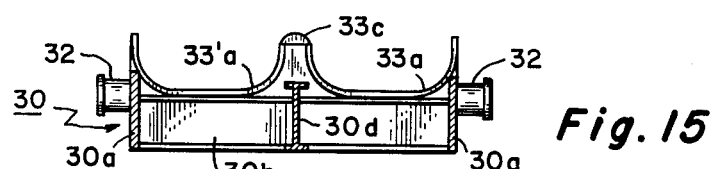
Fig. 16
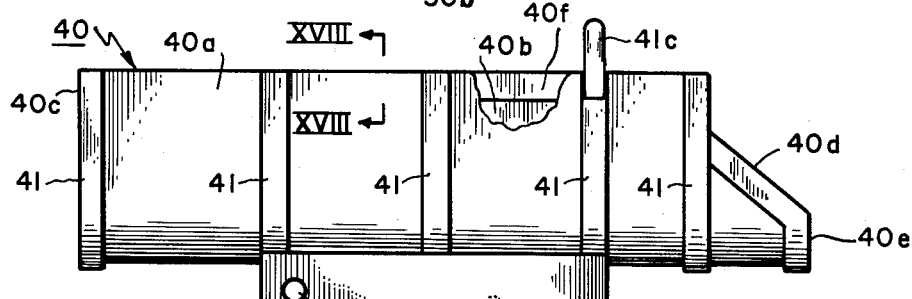
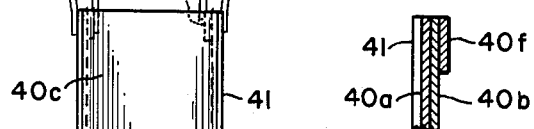
Fig. 17
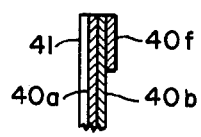
Fig. 18
INVENTORS
Richard P. Krause
Ira W. Lakin
BY
*Green, McCallister & Miller*
THEIR ATTORNEYS Oct. 26, 1965   R. P. KRAUSE ETAL   3,214,035
CHARGING SCRAP
Filed Oct. 28, 1963   7 Sheets-Sheet 7

United States Patent Office 3,214,035
Patented Oct. 26, 1965

3,214,035
CHARGING SCRAP
Richard P. Krause, Butler, and Ira W. Lakin, Volant, Pa., assignors to Pennsylvania Engineering Corporation, New Castle, Pa., a corporation of Pennsylvania
Filed Oct. 28, 1963, Ser. No. 319,245
19 Claims. (Cl. 214—18)

This invention relates to new and improved apparatus and procedure for handling and charging materials into a furnace and particularly, to apparatus and procedure for handling and charging scrap metal material into a melting or refining furnace, such as into the open mouth of an oxygen blow vessel.

This invention has been devised particularly from the standpoint of present day requirements as to scrap handling and charging and in view of the need for an apparatus which will be fully flexible in its utilization, will make maximum use of available plant facilities and minimize the requirements of plant space and, at the same time, will facilitate the charging of large furnaces through their open mouth portions.

Although oxygen blow furnaces originally were of relatively small capacity, such as in the neighborhood of twenty to fifty tons, the present trend is to employ furnaces of increasing size e.g., of up to two hundred, three hundred tons, etc. It will be appreciated that furnaces of large size require appreciable quantities of metal scrap material for completing their charge before a melting and refining operation. Our apparatus enables an operator to fill large capacity scrap boxes at a lower plant level, while they are positioned in an upright side by side relation as a group on a supporting carrier. Scrap material may be weighed before or after it has been introduced into the boxes. The supporting carrier enables the boxes to be raised to an upper or charging level corresponding to the open mouth of a furnace vessel or to open mouths of a longitudinally aligned group of furnace vessels.

The carrier is utilized to lift a pair or group of filled scrap boxes to the upper charging level or area of the furnace vessels, to place the boxes in an upright side by side relation on cradle frames of a self-propelled charging machine operatively positioned at the upper level, and to return the scrap boxes when they have been emptied back to the lower area or level of the plant. The boxes are handled in such a manner that they are retained in an associated or cooperating relation with a carrier frame, at all times, and even when lifted to the charging area or level and lowered into position on associated cradle frames. When the scrap boxes are in the latter position, the carrier frame is positioned on or carried by the charging machine.

The charging machine is adapted to move the carrier frame, the cradles and the associated scrap boxes with the boxes in an upright horizontal position wherein their open top portions and their charging forward end portions facing upwardly ready for a charging operation. The machine is moved longitudinally along an overhead track so as to first position one filled scrap box and its associated cradle frame in transverse alignment with the open mouth of a furnace vessel. At this time, the adjacent filled scrap box is out of alignment, but is adjacently positioned. The charging machine has means for tilting, swinging or raising the aligned cradle frame and its associated scrap box so as to tilt the scrap box forwardly towards its delivery end portion to discharge the scrap into the mouth of the furnace. In the apparatus illustrated, the raising operation is effected by a fluid motor. After the furnace vessel has been charged, this motor returns the cradle and its associated now-empty scrap box back to a horizontal positioning with respect to the charging machine. This charging machine is then operated to move a short distance along its track to selectively align the next scrap box and its associated cradle frame with the same furnace or, if it is a small furnace, with another furnace along the longitudinal line of the track. The charging operation is then repeated as to the second scrap box in the same manner and its associated cradle frame is then lowered back to its starting horizontal position. At this time, the carrier frame may be raised to lift the empty scrap boxes off their associated cradle frames and to thereafter lower them to the lower level or area where they may again be filled.

The scrap boxes and their associated cradle frames are provided with means such that boxes may be individually handled in an emergency, from the standpoint of raising them to the upper charging level, and also from the standpoint of tilting them at such a level. Also, in the event of failure of the motor means for swinging the cradle, such motor means may be disconnected from the cradle or its fluid lines opened and the cradle latched to the scrap box, in order that both of them may be tilted to charge the scrap by tilting the scrap box, as by the use of an overhead hoist means.

It will also be apparent that one or more scrap charging machines may be operatively positioned on the same overhead track, depending upon the charging requirements. The entire plant layout, system or apparatus construction is such that maximum use is made of available overhead crane or hoist equipment and interference is avoided with machines for charging molten metal into the furnace vessel, with exhaust hoods and with other equipment used with the vessels.

It has thus been an object of our invention to provide an improved apparatus and procedure for charging furnace vessels that will be particularly suitable where the scrap requirements are relatively heavy, as when extremely large size vessels are being utilized;

Another object of our invention has been to provide means for handling or carrying scrap boxes throughout their utilization in the plant which will maintain them in an upright side by side substantially horizontal positioning and which will remain in association with the scrap boxes throughout their utilization;

Another object of our invention has been to enable large capacity scrap boxes to be handled or carried in a unitary manner and, at the same time, which will make it possible for them to be individually or selectively tilted for charging metal scrap material into the mouth of the furnace vessels;

A further object of our invention has been to provide an improved procedure by which scrap boxes are handled as a group during the operations of filling them, moving them to a charging area, and returning them from the charging area to a filling area and, at the same time, by which the scrap boxes are individually handled at the charging area for selectively discharging scrap material into furnace vessels;

These and other objects of our invention will appear to those skilled in the art from the illustrated embodiments thereof, the description and the claims.

In the drawings, FIGURE 1 is a reduced side view in elevation of an apparatus utilization of our invention, illustrating procedure involved in carrying out our invention; it somewhat diagrammatically illustrates apparatus utilized in accordance with such procedure wherein a pair or group of scrap boxes are filled at a lower plant level or area A, are raised to a position B above a charging machine, are lowered in place transversely on a charging machine at an upper level or charging area C, and are then moved longitudinally into substantial alignment with the open mounth of a furnace vessel, as represented by D, and at which position individual boxes are selectively utilized to charge a furnace vessel;

FIGURE 2 is a slightly enlarged side view in elevation of a carrier frame of our invention, taken along the line II—II of FIGURE 1, as utilized to support a pair of scrap boxes, such as shown at position A of FIGURE 1, for moving them as a group between an upper furnace charging level or area and a lower box filling area or level. In this view, the carrier frame is shown cooperating with overhead hoist means;

FIGURE 3 is a side view in elevation similar to FIGURE 2, but illustrating the flexibility of the apparatus whereby, in an emergency, an individual scrap box may be directly lifted by overhead hoist means and directly tilted into a furnace charging position;

FIGURE 3A is a view in elevation on a reduced scale with reference to FIGURES 2 and 3, further illustrating the flexibility of the apparatus whereby overhead hoist means may be employed for tilting a filled scrap box and its associated cradle frame if, for some reason, motor means for swinging the cradle frame should become inoperative; this figure is taken from the side of the scrap boxes and their cradle frame and the end of the charging machine;

FIGURE 4 is a front side view in elevation of the charging machine, on the scale of FIGURES 2 to 3, and showing a carrier frame and its group of scrap boxes positioned transversely-endwise thereon; in this view, the scrap boxes are shown in a seated position with associated cradle frames that are carried by the charging machine;

FIGURE 5 is a side view in elevation of the charging machine, on the same scale as FIGURE 4 and of the apparatus of FIGURE 4, showing the delivery ends of the scrap boxes to the right of such figure;

Figure 6:
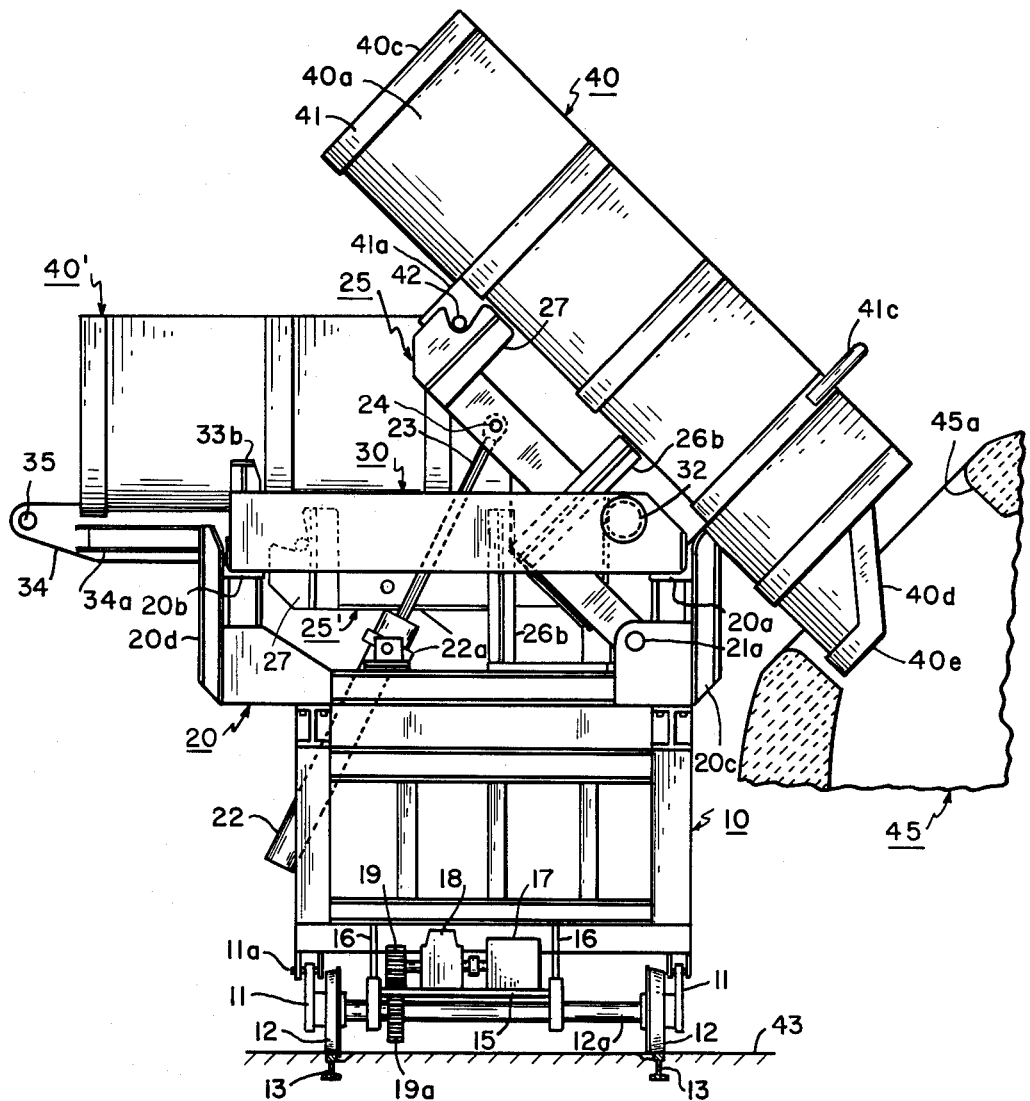
Figure 19:
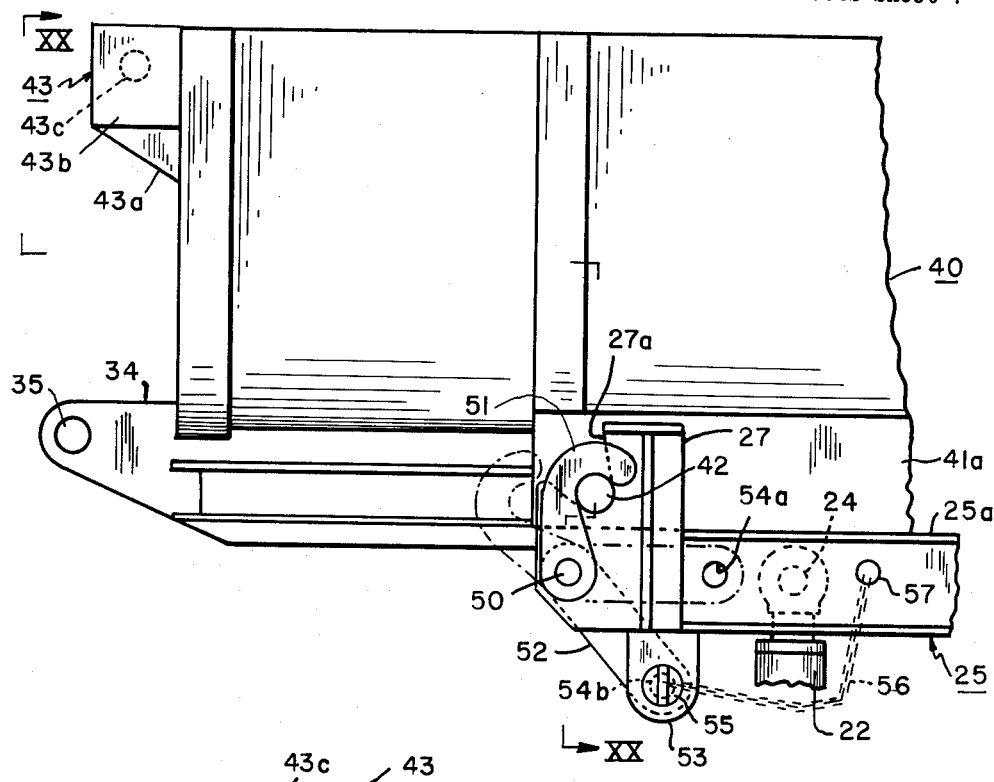
Figure 20:
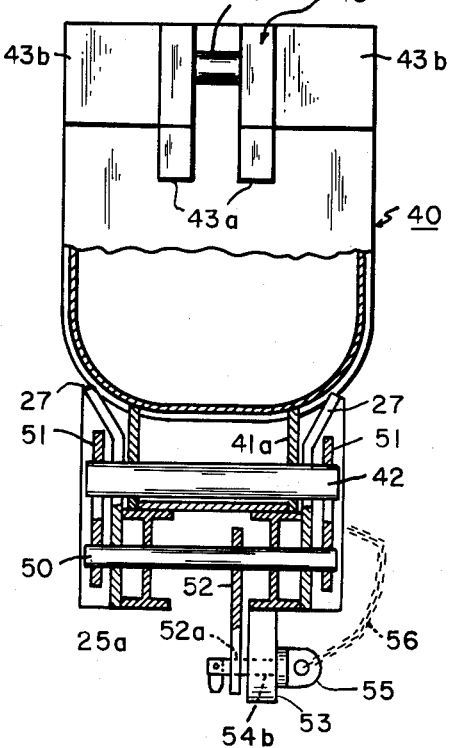

FIGURE 6 is an end view in elevation of the charging machine, taken on the line VI—VI of FIGURE 1, on the scale of FIGURES 4 and 5, and showing a side view of one cradle frame and its associated scrap box in a "down" or horizontal position and another cradle frame and its associated scrap box in an upwardly-forwardly tilted relationship to charge scrap material into the open mouth of the furnace vessel, after the charging machine has moved the latter cradle frame and its associated scrap box transversely into endwise alignment with the mouth of the vessel;

FIGURE 7 is a top plan view on the scale of FIGURE 6 of a support table or frame of the charging machine, with the cradle frames removed and showing motors for swinging or raising and lowering the cradle frames;

FIGURE 8 is a side view in elevation of the support table or frame of and on the scale of FIGURE 7;

FIGURE 9 is an end sectional view in elevation on the scale of FIGURE 7 and taken along the line IX—IX of such figure;

FIGURE 10 is a top plan view on the scale of FIGURE 7 illustrating a cradle frame of our invention;

FIGURE 11 is a side view in elevation of the cradle frame of and on the scale of FIGURE 10;

FIGURE 12 is an end view in elevation of the cradle frame of FIGURES 10 and 11;

FIGURE 13 is a top plan view on the scale of FIGURES 7 and 10 of the carrier frame of our invention;

FIGURE 14 is a side view in elevation of the carrier frame of FIGURE 13 and on the same scale as such figure;

FIGURE 15 is an end section on the scale of and taken along the line XV—XV of FIGURE 13;

FIGURE 16 is a side view in elevation on the scale of FIGURES 7, 10 and 13 of a scrap box of our invention;

FIGURE 17 is a back end view in elevation of the scrap box of FIGURE 6 and on the same scale as such figure;

FIGURE 18 is an enlarged fragmental section taken along the line XVIII—XVIII of FIGURE 16;

FIGURE 19 is an enlarged fragmental side view in elevation of a modified form of carriage frame and illustrating mechanism for latching its back end portion with the back end portion of an associated scrap box to, when desired, lift or swing them forwardly as a unit about the pivot means of the cradle frame by raising the scrap box, see FIGURE 3A;

And, FIGURE 20 is a back end view in elevation and partial section on the scale of and taken along the line XX—XX of FIGURE 19.

In the drawings, see particularly FIGURE 1, a pair of scrap boxes 40 and 40' are shown supported in an adjacent side by side, endwise-extending, upright relationship on a carrier frame 30 and when moved from a lower scrap filling and weighing plant area, level or position A, as by overhead hoist or crane means (see also FIGURE 2), to an upper level, area or position represented by C, are carried on a charging machine 10 after being lowered from an overhead aligned position B with respect to the charging machine. After the lowering has been effected at the upper level or area, see position D, the charging machine 10 is moved longitudinally along its track 13 on platform 44 to align one of the cradle frames and its associated scrap box, such as 40, with an open mouth portion 45a of a furnace vessel 45. Then, the aligned cradle frame 25 is swung upwardly by its associated fluid motor 22 to tilt the cradle frame and its associated scrap box for charging the furnace. It will be noted that the scrap boxes 40 and 40' are retained in a group relationship with respect to the carrier frame 30 throughout the charging operation and also when the reverse procedure is used to lift empty scrap boxes by means of their carriage frame 30 off the charging machine 10 and their associated cradle frames 25 and 25' and lower them to the scrap box filling and weighing area represented by A. As illustrated in FIGURES 1 and 2, the carrier frame 30 may be transported by overhead hoist means, such as 47 and 49.

The construction of the scrap boxes 40 and 40' is the same. Thus, the construction shown in FIGURES 16 to 18, inclusive, is illustrative of the construction of both the boxes 40 and 40'. As illustrated, the box 40 may be made of a heavy plate member 40a of substantially rounded rectangular shape or of convex shape from its bottom wall and along opposed side wall portions. The box 40 has a closed vertical back end portion 40c and an open front delivery end portion that is provided with a forwardly-declining rounded open end portion or chute 40e to guide the delivery of scrap material into the mouth of the furnace. The plate member 40a which defines opposed side walls and the bottom wall of the box 40 is reinforced by outer, strap-like and longitudinally spaced-apart reinforcing strap-like members 41. In a like manner, the edge of the chute portion 40e is reinforced by a strap-like member 40d.

As shown in FIGURE 18, the member 40a is provided with an inside liner reinforcement 40b that has a top reinforcing edge strip 40f along the length of the upper edge of liner 40b of the box. A pair of transversely spaced-apart vertical side members 41a are secured to project downwardly centrally of the bottom of the box 40, as shown particularly in FIGURES 16 and 17, and are reinforced and secured together by a bottom cross or connecting member 41b. A transverse trunnion shaft or pin 42 is secured to project between and endwise beyond the opposite side members 41a adjacent the back end of the bottom construction and thus, adjacent the back end portion of the scrap box 40. The rectangular shaped bottom portion defined by the side members 41a and transverse bottom member 41b provides a guide fitting for positioning the box 40 with and between cooperating side members of the carrier frame 30. Bails 41c define eyelets for receiving crane or hoist hooks and are secured, as by welding, to the box adjacent its front end portion in line with a reinforcing member 41 to project upwardly from opposite sides of the member 41a.

As shown particularly in FIGURES 13 to 15, inclusive, the carrier frame 30 is of a double box or compartment construction. As illustrated, it is adapted to support and carry a pair of side by side positioned scrap boxes 40 and 40' of similar construction. The carrier frame 30 has opposed, longitudinally-extending, side framing members 30a of heavy plate construction that are connected at their front ends by a closing end member 31. Members 30b and 30c, such as of I-beam construction, extend across the frame 30 adjacent its front end and its back end to reinforce and secure the side members 30a with respect to each other. Also, a longitudinal, compartment-defining member 30d, such as of I-beam construction, extends centrally-longitudinally along the frame 30 from the front closure member 31, centrally of the cross beam members 30b and 30c. The member 30d also projects backwardly of the frame 30 to, with diagonal or triangular members 34a, provide a support for a pair of spaced-apart plate members that define a bifurcated back end mount 34. The mount 34 carries a trunnion pin 35 for receiving a crane or hoist hook. Trunnion studs 32 project from opposite ends of the front beam member 30b to also receive crane or hoist hooks.

As shown particularly in FIGURES 13 to 15, the carrier frame 30 is provided with strap-like, half looped-shaped, upwardly-curved and concave, front and back, supporting saddles 33a, 33'a and 33b, 33'b that are secured to rest on and extend along the cross beam members 30a and 30b. The front end saddle 33a and the back end saddle 33b that define one box-receiving compartment extend transversely between one side member 30a and central member 30d; and, the front end saddle 33'a and the back end saddle 33'b that define a second box-receiving compartment extend transversely between the other side member 30a and the central member 30d. Each front and back pair of transversely-aligned saddles have their members secured together at their inner ends by a cap 33c to define the dividing line or spacing between support compartments for the pair of scrap boxes. The concave slope or curvature of the saddle members 33a, 33'a and 33b, 33'b corresponds to the convex slope or curvature of the bottom wall and adjacent side portions of the side walls of an associated scrap box 40 or 40', so as to position the boxes in an upright side by side relation on the carrier frame 30 and within its compartments.

Referring to FIGURE 2, by way of illustration, we have shown a hot metal ladle crane or hoist represented by 47 and having a transverse bail 46 which is provided with a pair of spaced-apart hooks 46a for engaging with the trunnion studs 32 to support and balance the front end of the carrier frame 30 when it is being moved, raised or lowered from one position to another. Also, in this figure, we have shown by way of illustration, a lift bail 48 carried by an auxiliary hoist 49. A hook 48a carried by the bail 48 is adapted to engage trunnion pin 35. It is thus apparent that the carrier frame 30 positions the scrap boxes in a horizontal balanced relation thereon and may be moved from place to place in this manner in a non-tilting and horizontally balanced relationship, while supporting a pair of filled or empty scrap boxes 40 and 40' in an upright side by side positioned relation.

With reference to the emergency operation illustrated in FIGURE 3, it will be noted that each scrap box, such as 40, may be moved or carried by the hook 48a of auxiliary hoist 49 and by lift bails 60 of a pair of hoists 61 through the agency of the engagement of their hooks 60a with the front bails 41c of the box. Also, the box 40 may be tilted to charge scrap material into the furnace vessel 45 by raising the hoist 49 and thus, the back end of the box 40 with respect to its front end and with respect to and about the pair of hooks 60a. In this connection, the scrap boxes 40 and 40' may be provided with back end mounts 43 that are centrally-secured to the back wall 40c, see particularly FIGURES 19 and 20. The mount 43 is provided by a pair of closely spaced vertical side portions 43a, reinforcing wing portions 43b and a cross trunnion pin 43c extending between the portions 43a. It will be noted that the transverse spacing of the vertical members 43a is rather close to slidably-receive the hook 48a of the hoist 49 therebetween and prevent swing of the box when it is being moved from one position to another or tilted as disclosed in FIGURE 3.

As illustrated particularly in FIGURES 4, 5 and 6, the charging machine 10 is in the form of a wheeled truck provided with an upwardly-projecting frame. By way of illustration, a pair of trucks 11 are carried along each side of the machine and are mounted on its frame by means of pins 11a. Each truck 11 has a pair of flanged wheels 12 which engage a longitudinally-extending track rail member 13. The wheels 12 of oppositely aligned trucks 11 have a common shaft 12a and at least one of them is driven through the agency of meshing gears 19 and 19a, a speed reduction unit 18 and an electric motor 17, so that the machine may be self-propelled. An under-suspended platform 15 positions the operating mechanism which includes the motor 17 and the speed reduction unit 18 and is carried by a supporting suspension 16 that projects from the under portion of the frame of the machine 10.

The upper portion of the frame of the charging machine 10 carries a stationary support table, platform or frame 20, see FIGURES 4 to 9. The support frame 20 has a pair of upwardly-projecting support posts 20a at the corners of its forward end and a pair of similar corner posts 20b at the corners of its back end upon which the carrier frame 30 is adapted to rest, see particularly FIGURE 5. Upwardly extending front and back end limit guide members or posts 20c and 20d cooperate with the seating posts 20a and 20b in positioning the carrier frame 30. It will be noted that the front and back ends of the frame 30 fit between or within the area defined by the guide members or posts 20c and 20d. It will also be noted (see FIGURES 1 and 4) that outwardly-downwardly sloped side shields 14 are mounted on the platform frame 20 and extend from cradle-receiving frame that projects upwardly from the platform frame.

Bifurcated mounts 21 are secured at the front corners of the stationary support or platform frame 20 on the outside of the posts 20a and a central mount 21A is secured on a central longitudinal and reinforcing member of the frame 20 (see FIGURES 7 and 8). Each mount 21 is provided with a pin 21a and the mount 21A is provided with a pin 21b for pivotally or swingably mounting front end portions of cradle frames 25 (see FIGURE 6). A reciprocating fluid motor 22, such as of a hydraulic type, is shown pivotally mounted on cross members 20e (see FIGURES 7 and 9) of the platform frame 20 by a collar 22a for raising and lowering each cradle frame 25. It will be noted that the platform frame 20 is constructed to centrally carry a pair of adjacent side by side positioned cradle frames 25. A piston rod 23 of each fluid motor 22 is provided at its upper end with an eye 23a for pivotally or swingably connecting it centrally by means of a pin 24 to the back end portion of an associated cradle frame 25 (see FIGURES 6, 9 and 10).

Although we have designated the cradle frames as 25 and 25', the construction of each is the same and thus FIGURES 10 to 12 illustrate the construction of both cradle frames. The cradle frame 25 is shown provided with a pair of transversely-spaced-apart side beam members 25a which define its sides and which are connected by a diagonal or forwardly-downwardly extending front end member 25b to carry a pair of forwardly-projecting transversely-spaced-apart side arms 26a. The arms 26a have holes therethrough to receive the pins 21a and 21b of the mounts 21 and 21A of the stationary frame 20 and to serve as a swing structure. In this connection, the outer wing 26a of the frame 25 will be connected to a corner mounted pin 21a and the inner or inside wing 26a will be mounted on or connected to an adjacent portion of a pin 21b of the central mount 21A, so that the carriage frame may be swung thereabout. In FIGURES 11 and 11, 26 constitutes a bottom cradle portion of the frame 25.

Inner portions of the side members 25a of each cradle frame 25 carry a pair of bosses 25d to receive pivot pin 24 which is adapted to fit within the eye 23a of an associated motor 22. Back end portions of the side members 25a are connected by a transverse end piece 25c. A pair of opposed back guide legs, lugs or wings 27 project upwardly from the back end portions of the side members 25a and incline transversely-outwardly as shown particularly in FIGURE 10, to define a receiving aperture for a back end portion of one of the scrap boxes 40 or 40' that is adapted to seat therein. Each wing 27 has a backwardly-upwardly-open and downwardly-forwardly sloped slot portion 27a for removably-receiving opposed end portions of the trunnion shaft or pin 42 of the associated scrap box. A pair of upwardly-projecting and transversely-outwardly sloped front side wings 26b are adapted to guidably-seat sides of the bottom rectangular portion of an associated scrap box 40 or 40' in cooperation with the opposed back side wings 27.

It will be apparent that the scrap boxes can be lowered into and raised out of an associated cradle frame 25, but at the same time, will be retained within the cradle for the tilting and swinging movement represented by FIGURE 6 of the drawings. Since the carrier frame 30 is adapted to be lowered into position on the support frame 20, about the pair of adjacently-positioned cradle frames 25, for seating filled scrap boxes on an associated cradle frame, and since the cradle frames rest upon the support frame 20, it will be apparent that as illustrated, the individual scrap boxes 40 and 40' and their associated cradle frames 25 may be swung or tilted forwardly into a furnace charging position from a normal horizontal position within the bounding carrier frame 20, and without disturbing the positioning of the latter frame on the stationary frame 20.

In FIGURES 19 and 20, we have shown a modified construction which may be utilized for latching a cradle frame 25 and its associated scrap box 40 or 40' together, in order that both may be lifted by lifting the scrap box, in the event that the associated motor 22 becomes inoperative. In this connection, the opposed wings 27 of the cradle frame 25 carry a pair of latch fingers or elements 51 that are pivotally mounted thereon by a cross shaft 50 on whose ends they are secured. As shown particularly in FIGURE 20, an operating arm 52 is, at one end, secured on the shaft 50 between side members 25a and projects therefrom to receive a removable pin 55 through an opening or hole 52a therein. The arm 52 may be moved to its upper dot-and-dash position of FIGURE 19 and the pin 55 inserted through a hole 54a in the associated side member 25a of the carriage frame 25 to hold the latch elements 51 in their normal dot and dash "down" or unlatched positions with respect to the ends of the trunnion shaft 42 of the scrap box. This will be the position when the motor 22 is operative. However, the element 51 may be moved to its full line, latched position of FIGURE 19 to maintain the ends of the shaft 42 within the slotted portions 27a of the wings 27, if the motor 22 should fail. Thus, a hoist 49 whose hook 48a engages trunnion pin 43c of the scrap box may tilt the assembly through the agency of the scrap box, as illustrated in FIGURE 3A.

In the construction of FIGURES 19 and 20, one of the side members 25a has a downwardly-projecting lug 53 provided with a hole 54b therein to receive the pin 55 and position the arm 52 in its full-line "down" or latching position of FIGURES 19 and 20. In order to avoid losing the pin 55, it is shown provided with a flexible cable or chain 56 whose extending end is secured as by a rivet or weld mounting 57 to an adjacent side member 25a of the cradle frame 25.

Although we have shown representative apparatus for illustrating our invention, it will be apparent that various changes and modifications may be made without departing from its spirit and scope, as indicated by the appended claims.

What we claim is:

1. Improved apparatus for charging an open mouth of a furnace with scrap material which comprises, at least one scrap box having a front furnace-charging end and an open top for filling it with scrap material, a carrier frame, said carrier frame having means cooperating with and removably supporting the scrap box in an upright position thereon and for retaining the scrap box in an upright position thereon while it is being filled with scrap material and while it is being moved to a furnace charging area, a cradle frame within the charging area for swingable movement to and from a forwardly tilted position with respect to the furnace mouth, means cooperating with said carrier frame for moving the filled scrap box to a seated position on said cradle frame, and means for moving said cradle frame and the filled scrap box thereon to the forwardly tilted position of said cradle frame to tilt said scrap box forwardly into a scrap charging position with the open mouth of the furnace.

2. An improved apparatus as defined in claim 1 wherein, said cradle frame has portions for seating said scrap box thereon while said scarp box is supported by said carrier frame, and said carrier frame has means to retain it in a substantially horizontal position while said scrap box is moved with said cradle from its supported position with respect to said carrier frame into its scrap charging position.

3. An improved apparatus as defined in claim 1 wherein said cradle frame and said scrap box have cooperating latching portions, so that said scrap box cannot be tilted without tilting said cradle frame.

4. An improved apparatus as defined in claim 1 wherein, a charging car swingably carries said cradle frame thereon and is adapted to move the filled scrap box seated on said cradle frame into and out of alignment with the open mouth of the furnace, and said charging car has means for seating said carrier frame thereon in a non-interfering relation with said cradle frame with respect to its tilting operation when said carrier frame has moved the filled scrap box to a seated position on said cradle frame.

5. An improved apparatus for charging an open mouth of a furnace with scrap material which comprises, a pair of scrap boxes each having a front furnace-charging end and an open top for filling it with scrap material, a carrier frame having means for supporting said scrap boxes in a side by side adjacent relation with each other in an upright position therewithin while said scrap boxes are being filled with scrap material and moved to a furnace charging area, a pair of side by side positioned cradle frames within the charging area for swingable movement to and from a forwardly tilted position with respect to the furnace mouth, means cooperating with said carrier frame for lifting the filled scrap boxes supported thereon above said cradle frames and for lowering them into a cooperating seated position within an associated one of said cradle frames, means for seating said carrier frame about said cradle frames when said scrap boxes are lowered into a seating position within the associated cradle frames, means for selectively moving said cradle frames and their associated seated scrap boxes within the furnace charging area into charging alignment with the open mouth of the furnace, and means for individually tilting each of said scrap boxes forwardly on its associated cradle frame and with respect to said carrier frame into a scrap-charging position with the open mouth of the furnace.

6. An improved apparatus as defined in claim 5 wherein, said cradle frame is defined by longitudinally-extending side members, a central longitudinally-extending member and connecting transversely-extending end members; upwardly-curved and concave front and back saddle members are positioned on each of said end members and extend transversely between each side member and said central member to define box-supporting compartments on said carrier frame, each of said scrap boxes has a bottom wall and opposed side wall portions that are convexly-curved downwardly to seat on the said saddle members, each scrap box has a bottom rectangular portion to fit between the side member and the central member of one of the compartments, said bottom rectangular portion has a trunnion shaft extending transversely through its back end portion; each cradle frame has a pair of upwardly-outwardly projecting back side wings adjacent its back end portion, each provided with upwardly-backwardly open slot portion to receive opposite ends of said trunnion shaft when one of said scrap boxes is seated within said cradle frame; each cradle frame has a pair of upwardly-outwardly projecting front side wings adjacent its front end portion to cooperate with said back side wings in seating said bottom rectangular portion of an associated scrap box therebetween, and each of said scrap boxes has means for lifting it into and out of position within said carrier frame.

7. An improved apparatus as defined in claim 6 wherein, each cradle frame has a latching shaft rotatably-extending through its back end portion, a pair of latch elements are secured on opposite ends of said latching shaft for turning movement therewith between latch-engaging and disengaging positions with said trunnion shaft whereby said cradle frame is secured to its associated scrap box for lifting movement therewith when said latch elements are in their latching-engaging positions, an operating arm is secured at one end on said latching shaft for turning said shaft to move said latch elements between their latch-engaging and disengaging positions, and pin means cooperates with the other end of said operating arm and with said cradle frame to secure said latch elements alternatively in their latch-engaging and disengaging positions with said trunnion shaft.

8. Improved apparatus for charging an open mouth of a furnace with scrap material which comprises, a furnace charging car operatively mounted on an upper plant level for movement into and out of a charging position with the open mouth of the furnace, at least one scrap box having a front furnace charging end and an open top for filling it with scrap material on a lower plant level, a carrier frame for removably supporting the scrap box and positioning it thereon at the lower plant level while it is being filled with scrap material, said charging car having support means, a cradle frame swingably positioned on said support means for movement between a substantially horizontal position thereon to a forwardly tilted position thereon, means cooperating with said carrier frame for moving the filled scrap box removably supported thereon from the lower plant level to a seated position within said cradle frame, said charging car having means for moving said cradle frame and the filled scrap box into charging alignment with the open mouth of the furnace, and means for swingably moving the filled scrap box and said cradle frame with respect to said support means to tilt said scrap box forwardly into a scrap-charging position with the open mouth of the furnace.

9. Improved charging apparatus as defined in claim 8 wherein said support means has means for receiving said carrier frame in a seated relation thereon when the filled scrap box is moved into a seated position within said cradle frame and for retaining said carrier frame in a seated relation on said support means when said scrap box is tilted into its scrap-charging position.

10. Improved charging apparatus as defined in claim 8 wherein said carrier frame has forwardly-positioned side trunnions and a back end frame to receive overhead hoist hooks, whereby said carrier frame may be employed to raise the filled scrap box from the lower to the upper plant level and to lower the filled scrap into a seated position with said cradle frame and to thereafter, raise the scrap box when empty from its seated position within said cradle frame and lower it to the lower plant level for refilling.

11. An improved charging apparatus as defined in claim 10 wherein said scrap box and said carrier frame have cooperating portions for retaining said scrap box in an upright relation thereon.

12. An improved apparatus for charging an open mouth of a furnace with scrap material which comprises, a charging car operatively mounted for longitudinal movement in an upper furnace charging area into and out of transverse alignment with the open mouth of the furnace, means for moving said car in the upper furnace charging area, a support frame carried by an upper portion of said car, at least a pair of cradle frames operatively positioned for transverse tilting movement within said support frame, means carried by said support frame to pivotally mount each of said cradle frames adjacent a front end portion thereof for swinging movement between a substantially horizontal position on said support frame and a forwardly tilted inclined position with respect to said support frame, a pair of elongated scrap boxes each having an open scrap-receiving top portion and a forward scrap delivery end portion, a carrier frame having means for securely positioning said pair of scrap boxes in an upright adjacent side by side relation with respect to each other thereon, means cooperating with said carrier frame for lifting the pair of scrap boxes when filled at a lower scrap delivery area into cooperating seating positions on said cradle frames wherein said scrap boxes have a transverse positioning with respect to the direction of movement of said car and wherein said carrier frame is seated on said support frame, each of said scrap boxes being adapted to seat within an associated one of said cradle frames, and means for transversely-forwardly tilting each of said scrap boxes with its associated cradle frame therefrom into the open mouth of the furnace when said car has been longitudinally moved to a position wherein said scrap box and its associated cradle frame are aligned with the open mouth of the furnace.

13. An improved charging apparatus as defined in claim 12 wherein said means for tilting comprises a pair of fluid motors carried by said car and operatively-centrally connected to said cradle frames behind said pivot mounting means.

14. Improved charging apparatus as defined in claim 12 wherein, said carrier frame has a pair of side-mounted back-positioned upwardly-slotted wing portions, each of said scrap boxes has a pair of side trunnions to liftably-engage within said slotted wing portions, said carrier frame and said scrap boxes having cooperating side frame portions to retain said scrap boxes in position thereon against horizontal and against vertical downward movement and in the adjacent side by side positioning with respect to each other, and said scrap boxes have front and back positioned means for lifting them out of and lowering them into position within said carrier frame.

15. An improved charging apparatus as defined in claim 12 wherein said support frame has front and back positioned supporting and horizontal and vertical downward movement-restricting means for seating said carrier frame thereon in such a manner that said cradle frames may be swung between horizontal and tilted positions on said support frame with respect to and within said carrier frame.

16. An improved charging apparatus as defined in claim 12 wherein at least one of said scrap boxes has a hoist hook-receiving mount secured on its back end portion whereby it may be tilted forwardly with respect to said carrier frame.

17. An improved charging apparatus as defined in claim 12 wherein at least one of said scrap boxes has forward hoist hook-receiving eyelet means and has a hoist hook-receiving eyelet means on its back end portion, whereby said scrap box may be lowered and raised into and out of said carrier frame and whereby said scrap box may be tilted forwardly about its forward eyelet means to discharge scrap material therefrom.

18. An improved charging machine as defined in claim 12 wherein, each of said scrap boxes has a pair of back positioned trunnion portions, each of said cradle frames has a pair of back positioned side wings provided with upwardly-open slot portions to receive said trunnion portions therein, and latching means is operatively carried by each of said cradle frames to latch-engage over said pair of trunnion portions of an associated scrap box in such a manner as to retain said trunnion portions within the slot portions of said side wings and enable said cradle frame to be raised and lowered by raising and lowering its associated scrap box.

19. An improved charging apparatus as defined in claim 12 wherein said cradle frames have latching means to engage the trunnions of an associated scrap box for locking the associated scrap box in its seated position with respect thereto, each of said scrap boxes has a hoist hook-receiving mount secured at its back end portion for lifting it and for lifting the associated cradle frame therewith to forwardly tilt the associated cradle frame and said scrap box to discharge scrap therefrom into the open mouth of the furnace.

References Cited by the Examiner

UNITED STATES PATENTS

| | | | |
|---|---|---|---|
| 2,836,309 | 5/58 | McFeaters | 214—18 |
| 3,107,797 | 10/63 | McFeaters et al. | 214—18 |
| 3,160,296 | 12/64 | Tocher et al. | |

HUGO O. SCHULZ, *Primary Examiner.*